United States Patent
Kim

(10) Patent No.: US 11,247,640 B2
(45) Date of Patent: Feb. 15, 2022

(54) WIPER APPARATUS HAVING ARRANGEMENT STRUCTURE BETWEEN WIPER ARM TIP AND VERTEBRA

(71) Applicant: DY AUTO Corporation, Asan-si (KR)

(72) Inventor: Jae Woong Kim, Asan-si (KR)

(73) Assignee: DY Auto Corporation

( * ) Notice: Subject to any disclaimer, the term of this patent is extended or adjusted under 35 U.S.C. 154(b) by 538 days.

(21) Appl. No.: 16/228,475

(22) Filed: Dec. 20, 2018

(65) Prior Publication Data
US 2019/0217822 A1 Jul. 18, 2019

(30) Foreign Application Priority Data
Jan. 18, 2018 (KR) .......... 10-2018-0006648

(51) Int. Cl.
*B60S 1/38* (2006.01)
*B60S 1/40* (2006.01)

(52) U.S. Cl.
CPC .......... *B60S 1/3849* (2013.01); *B60S 1/3851* (2013.01); *B60S 1/3858* (2013.01); *B60S 1/3874* (2013.01); *B60S 1/3881* (2013.01); *B60S 1/3882* (2013.01); *B60S 1/4045* (2013.01); *B60S 1/4048* (2013.01); *B60S 2001/4051* (2013.01)

(58) Field of Classification Search
CPC .. B60S 1/34; B60S 1/40; B60S 1/4067; B60S 1/3443; B60S 1/0408; B60S 1/4038; B60S 1/4045; B60S 1/4048; B60S 2001/4051; B60S 2001/4054; B60S 1/3849; B60S 1/3848; B60S 1/3874; B60S 1/3875; B60S 1/3877; B60S 1/3879; B60S 1/3881; B60S 1/3882; B60S 1/3856; B60S 1/3851; B60S 1/3858
USPC ........................................ 15/250.32, 250.351
See application file for complete search history.

(56) References Cited

U.S. PATENT DOCUMENTS

| 6,449,797 | B1 * | 9/2002 | De Block | B60S 1/4038 |
| | | | | 15/250.201 |
| 6,634,055 | B1 * | 10/2003 | De Block | B60S 1/4064 |
| | | | | 15/250.32 |
| 6,675,432 | B1 | 1/2004 | De Block | |
| 2010/0212101 | A1 * | 8/2010 | Thienard | B60S 1/3868 |
| | | | | 15/250.32 |

(Continued)

FOREIGN PATENT DOCUMENTS

| FR | 2781741 | * 2/2000 |
| KR | 10-2001-0042667 | 5/2001 |

(Continued)

OTHER PUBLICATIONS

Office Action, dated Apr. 19, 2018, issued in Republic of Korea Patent Application No. 10-2018-0006648.

(Continued)

*Primary Examiner* — Gary K. Graham
(74) *Attorney, Agent, or Firm* — Klarquist Sparkman, LLP

(57) ABSTRACT

A wiper apparatus having an improved structure between a wiper arm tip and a vertebra includes a vertebra having a rod shape and providing elastic resilience to a wiper strip, a connector fixed to the vertebra; and a wiper arm detachably coupled to the connector. The position of the vertebra is above a lower end of an arm tip formed on a free end portion of the wiper arm.

3 Claims, 5 Drawing Sheets

(56) References Cited

U.S. PATENT DOCUMENTS

2013/0239353 A1\* 9/2013 Yoshimoto ............ B60S 1/3851
15/250.32

FOREIGN PATENT DOCUMENTS

| KR | 10-2009-0012532 A | 2/2009 |
| KR | 10-2009-0088517 A | 8/2009 |

OTHER PUBLICATIONS

Notice of Allowance, dated Aug. 27, 2018, issued in Republic of Korea Patent Application No. 10-2018-0006648.

\* cited by examiner

WIPER APPARATUS HAVING ARRANGEMENT STRUCTURE BETWEEN WIPER ARM TIP AND VERTEBRA

CROSS-REFERENCE TO RELATED APPLICATION

This application claims the benefit of Korean Patent Application No. 10-2018-0006648, filed on Jan. 18, 2018, in the Korean Intellectual Property Office, the disclosure of which is incorporated herein in its entirety by reference.

BACKGROUND

1. Field

One or more embodiments relate to a structure of a wiper apparatus for an automobile, and more particularly, to an arrangement structure between a wiper arm tip and a vertebra.

2. Description of the Related Art

In general, a wiper apparatus is installed in an automobile to effectively remove foreign materials on a front or rear glass of the automobile so that a driver may have clear front or rear vision. A wiper apparatus, as one of the major safety devices for an automobile, is very important. In the wiper apparatus, a blade is detachably coupled to a free end portion of a wiper arm that performs repetitive pivoting motion by a motor installed on a vehicle frame, and the blade removes foreign materials adhering on a surface of glass.

Since the blade of a wiper apparatus is a consumable, the blade needs to be replaced after use for a certain amount of time. In order to easily replace the blade that is a consumable, the wiper arm and the blade are detachably coupled via a connector coupled to the blade. In general, the connector is firmly fixed on a vertebra that is a panel-shaped rod type part for elastically supporting a wiper strip. Furthermore, the connector is coupled to the wiper arm via a spacer that is rotatably coupled to the connector. Korean Patent No. 0692369 discloses an example of the above wiper apparatus.

However, in general, in an operation of the wiper apparatus, torsional moment is generated due to friction between the wiper strip and the glass surface of an automobile. However, in a wiper apparatus according to the related art, the vertebra is located at a position lower than a lower end portion of the wiper arm tip. In the above arrangement structure, the torsional moment may act on a connection portion between the wiper apparatus and the wiper arm due to the friction force acting on the wiper strip. In particular, as a distance between the lower end portion of the wiper arm tip and the vertebra increases, the quantity of the moment increases. Accordingly, vibration is generated between the wiper apparatus and the wiper arm. As a result, the operating performance of the wiper apparatus may deteriorate and noise may be generated.

SUMMARY

One or more embodiments include a wiper apparatus, in which torsional moment generated between a wiper apparatus and a wiper arm may be reduced by improving an arrangement structure of a vertebra forming a wiper apparatus and an arm tip forming a wiper arm, and thus vibration of the wiper apparatus may be prevented.

Additional aspects will be set forth in part in the description which follows and, in part, will be apparent from the description, or may be learned by practice of the presented embodiments.

According to one or more embodiments, a wiper apparatus having a structure between a wiper arm tip and a vertebra includes a vertebra having a rod shape to provide elastic resilience to a wiper strip, a connector fixed to the vertebra, and a wiper arm detachably coupled to the connector, in which the vertebra is disposed above a lower end of an arm tip formed on a free end portion of the wiper arm, a spacer is coupled to the connector to be rotatable in a certain range and detachably coupled to the wiper arm, and in rotation of the spacer in a certain angular range with respect to the connector, a rotation angular range of the spacer is determined as a rotation range detection protrusion provided in the spacer is stopped by a stopper provided in the connector.

A vertical distance between the vertebra and a lower end of the arm tip may be about 2 mm to about 5 mm.

The spacer may include a detachment switch that serves as a key when the spacer is detachably coupled to the wiper arm. The detachment switch may include a pair of arm portions extending from both front lower portions of the spacer toward a rear side and a handle portion connecting the arm portions. The arm portion may include an escape prevention recess portion that prevents escape of the wiper arm.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, reference will now be made in detail to embodiments, examples of which are illustrated in the accompanying drawings.

Figure 1:
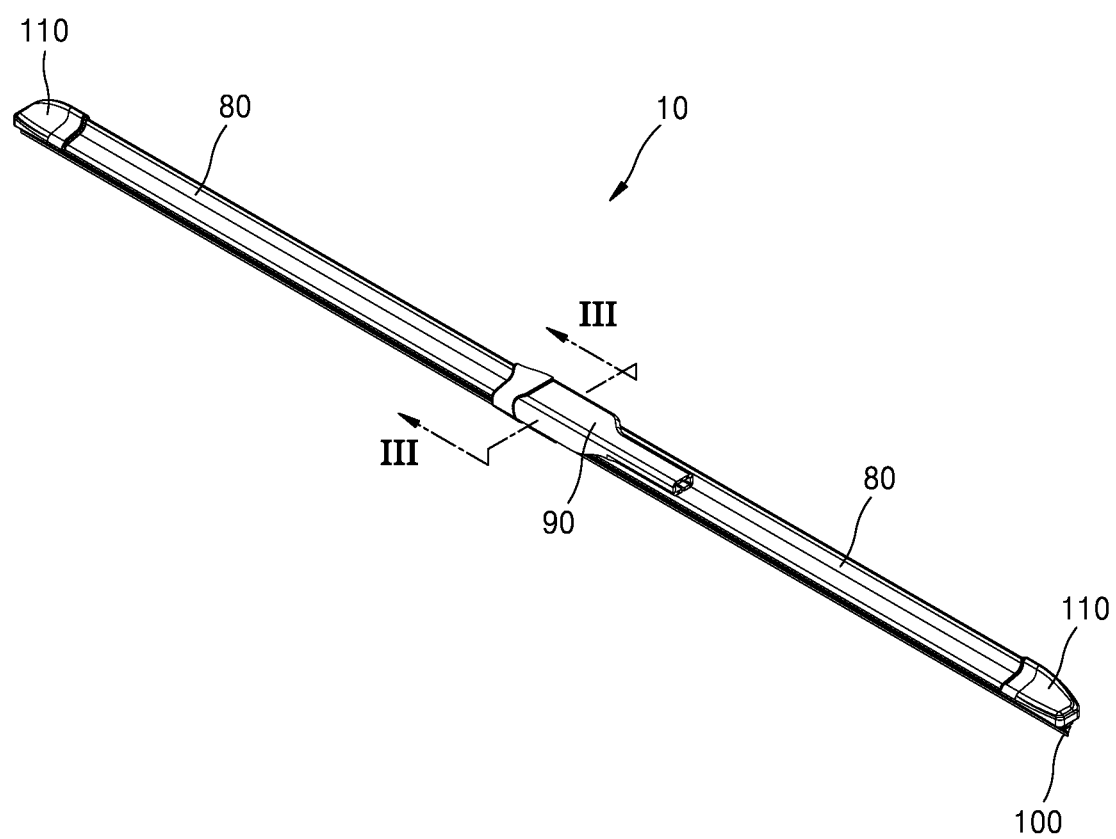
FIG. 1 is a perspective view of a wiper apparatus according to an embodiment.

FIG. 1 is a perspective view of a wiper apparatus according to an embodiment.

Figure 2:
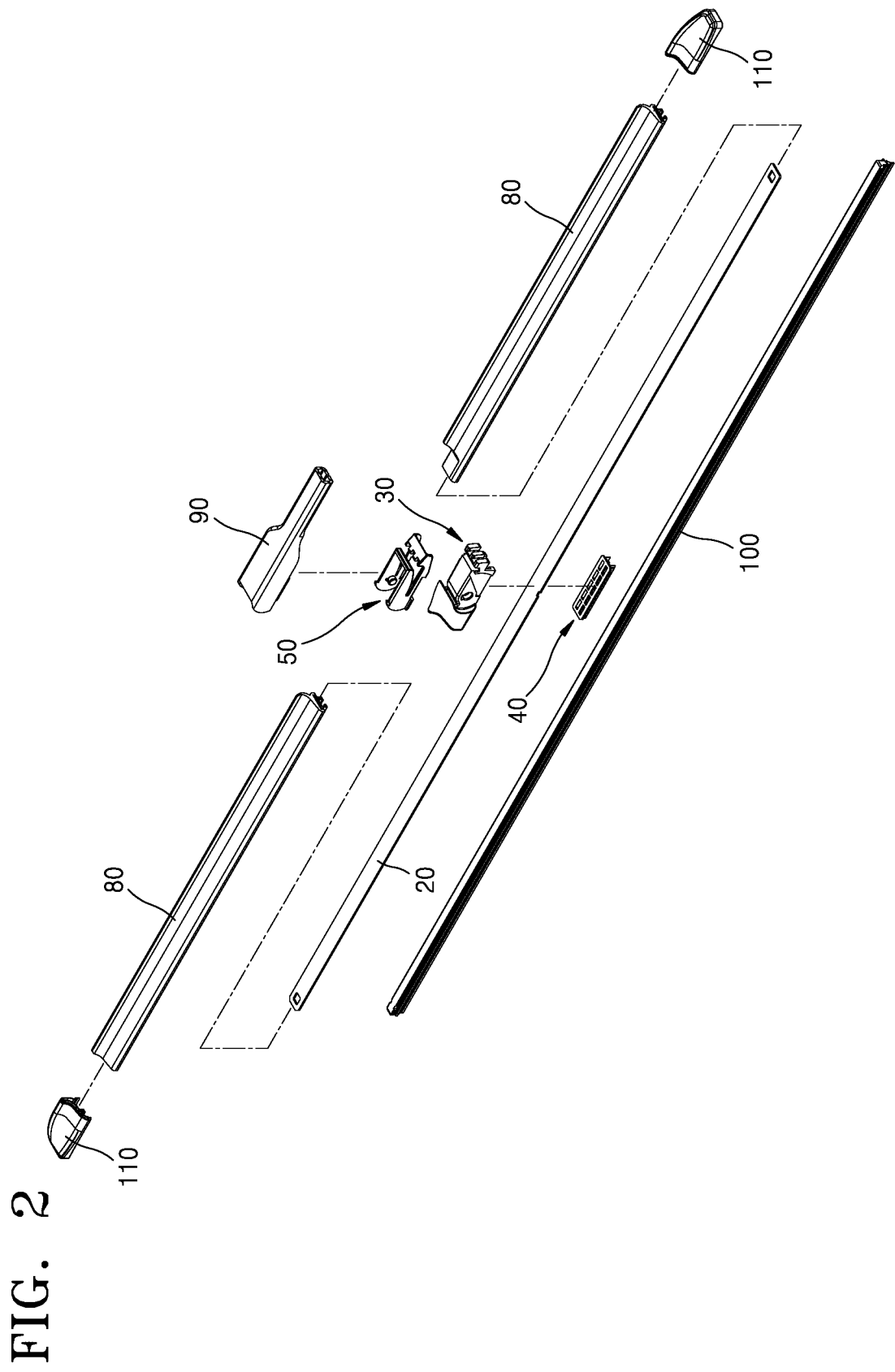
FIG. 2 is an exploded perspective view of the wiper apparatus of FIG. 1.

FIG. 2 is an exploded perspective view of the wiper apparatus of FIG. 1.

Figure 3:
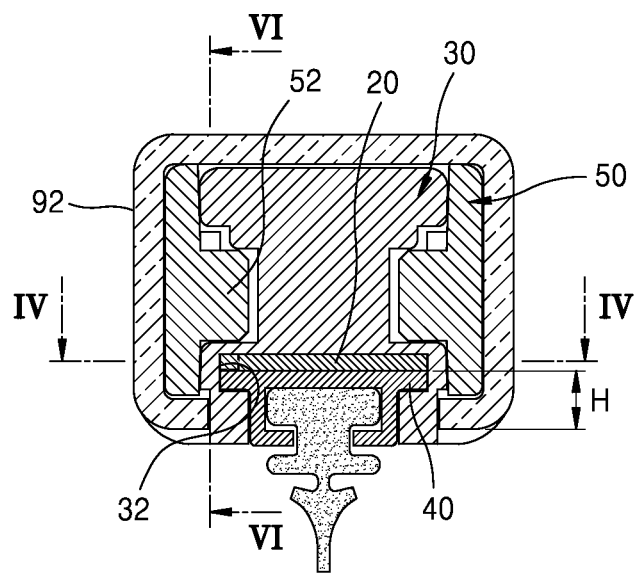
FIG. 3 is a cross-sectional view taken along line III-III of FIG. 1.

FIG. 3 is a cross-sectional view taken along line III-III of FIG. 1.

Figure 4:
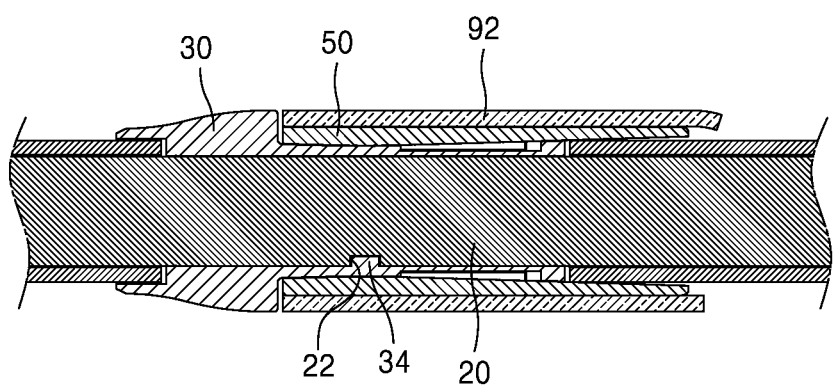
FIG. 4 is a cross-sectional view taken along line IV-IV of FIG. 3.

FIG. 4 is a cross-sectional view taken along line IV-IV of FIG. 3.

Figure 5:
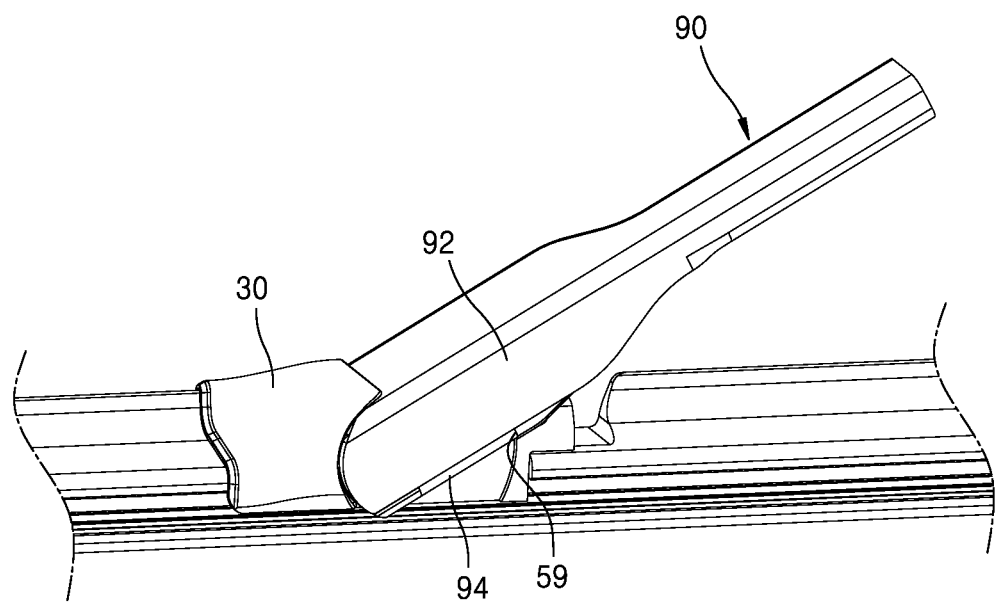
FIG. 5 illustrates a coupling structure of an arm tip and a spacer in the wiper apparatus of FIG. 1.

FIG. 5 illustrates a coupling structure of an arm tip and a spacer in the wiper apparatus of FIG. 1.

Figure 6:
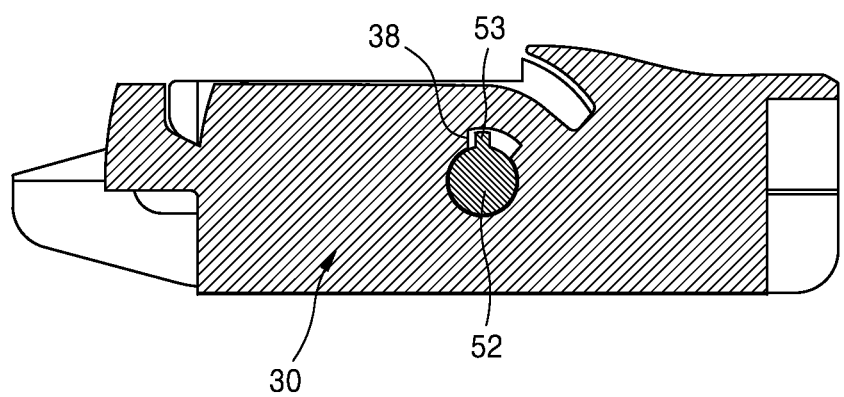
FIG. 6 is a cross-sectional view taken along line VI-VI of FIG. 3.

FIG. 6 is a cross-sectional view taken along line VI-VI of FIG. 3.

Figure 7:
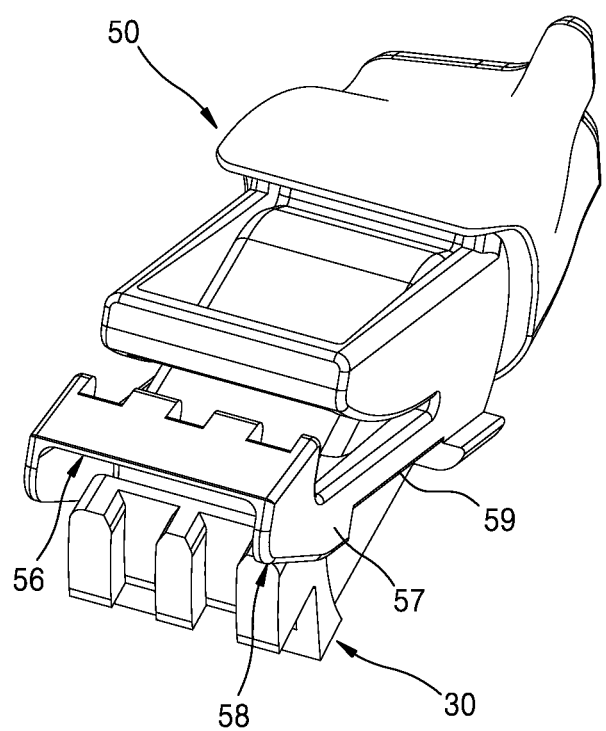
FIG. 7 illustrates a state in which the spacer of FIG. 2 is coupled to a connector.

FIG. 7 illustrates a state in which the spacer of FIG. 2 is coupled to a connector.

Referring to FIGS. 1 to 7, a wiper apparatus 10 having an improved structure between a wiper arm tip and a vertebra according to an embodiment (hereinafter, referred to as the "wiper apparatus") may include a vertebra 20, a connector 30, a holder member 40, a spacer 50, and a wiper arm 90.

The vertebra 20 may be formed of a metal material exhibiting superior bending elastic resilience. The vertebra 20 may be manufactured of, for example, carbon steel or stainless steel. The vertebra 20 is formed of a panel-shaped rod type. The vertebra 20 provides elastic resilience to a wiper strip 100 that directly contacts glass of an automobile so that the wiper strip 100 may well contact a curved surface of the glass of the automobile.

The vertebra 20 may include a protrusion accommodation recess 22. The protrusion accommodation recess 22 is a recessed portion formed to be concave from a side surface of the vertebra 20. The protrusion accommodation recess 22 is coupled to a movement prevention protrusion 34 that is described later.

The connector 30 is disposed at an upper center portion in a lengthwise direction of the vertebra 20. The connector 30 is disposed to contact an upper surface of the vertebra 20. The connector 30 may include a tunnel-type coupling portion 32. The tunnel-type coupling portion 32 is formed on a lower portion of the connector 30. The tunnel-type coupling portion 32 surrounds both side surfaces and an edge portion of a lower surface of the vertebra 20. The tunnel-type coupling portion 32 is a structure in which a lower side is open. The tunnel-type coupling portion 32 of the connector 30 may be provided with the movement prevention protrusion 34. The movement prevention protrusion 34 is a protrusion protruding from a side wall of the tunnel-type coupling portion 32 toward the vertebra 20. A cross-sectional surface of the movement prevention protrusion 34 may have a rectangular shape.

The holder member 40 is a member for fixing the connector 30 to the vertebra 20. The holder member 40 is slidably coupled to the vertebra 20 along a lower surface of the vertebra 20. As the holder member 40 is forcibly inserted in the tunnel-type coupling portion 32, the vertebra 20 and the connector 30 are fixed to each other.

The spacer 50 is coupled to the connector 30 to be rotatable in a certain angular range. In a configuration that enables the spacer 50 to rotate in certain angular range with respect to the connector 30, for example, as illustrated in FIG. 6, the angular range is determined as a rotation range detection protrusion 53 provided in the spacer 50 is stopped by a stopper 38 provided in the connector 30.

The spacer 50 is detachably coupled to the wiper arm 90. The connector 30 and the spacer 50 are media that enable coupling of the wiper apparatus 10 and the wiper arm 90. The spacer 50 is rotatably coupled to the connector 30 around a rotation shaft 52.

Furthermore, the spacer 50 may include a detachment switch 56 as illustrated in FIG. 7.

The detachment switch 56 serves as a key when the wiper arm 90 is detachably coupled to the spacer 50. The detachment switch 56 may include a pair of arm portions 57 extending from both front lower portions of the spacer 50 toward a rear side and a handle portion 58 connecting the arm portions 57 to each other. The arm portions 57 may include an escape prevention recess portion 59 for preventing escape of the wiper arm 90. The escape prevention recess portion 59 is locked with or released from the wiper arm 90 by an external force applied to the handle portion 58.

A spoiler 80 that supports the wiper strip 100 and guides flow of air pressing the wiper strip 100 toward glass of an automobile is coupled to both sides of the vertebra 20 with respect to the connector 30. A cover member 110 for preventing escape of the spoiler 80 and the wiper strip 100 may be coupled to both end portions of the vertebra 20.

The wiper arm 90 is detachably coupled to the spacer 50. The free end portion of the wiper arm 90 is defined to be referred to as an arm tip 92. The arm tip 92 is slidably coupled to or separated from the spacer 50. The arm tip 92 is slidably coupled to or separate from the spacer 50 along a lower end surface of the arm portions 57 provided in the spacer 50. An escape prevention protrusion 94 that is coupled to the escape prevention recess portion 59 provided in the spacer 50 is provided in the arm tip 92. As a wiper blade integrally with the wiper arm 90 repeatedly pivots to the left and right when the arm tip 92 is coupled to the spacer 50, foreign materials on the glass surface of an automobile may be removed.

A lower end of the arm tip 92 that is coupled to the spacer 50 as illustrated in FIG. 3 is configured to be disposed lower than the vertebra 20. In other words, the position of the vertebra 20 is above the lower end of the arm tip 92 formed on the free end portion of the wiper arm 90. In detail, a vertical distance H between the vertebra 20 and the lower end of the arm tip 92 may be about 2 mm to about 5 mm. When the vertical distance H between the vertebra 20 and the lower end of the arm tip 92 is less than about 2 mm, an upper portion of the wiper strip 100 supported by the vertebra 20 is excessively exposed to the outside, thereby deteriorating exterior quality and increasing a distance from the rotation shaft 52 of the arm tip 92. Accordingly, it is problematic that torsional moment between the wiper blade and the wiper arm 90 may increase. When the vertical distance H between the vertebra 20 and the lower end of the arm tip 92 is greater than about 5 mm, the upper portion of the wiper strip 100 supported by the vertebra 20 is excessively accommodated inside the arm tip 92, and thus the arm tip 92 interferes with the glass surface of the automobile, thereby damaging the wiper apparatus 10 or deteriorating wiping performance.

As such, in the wiper apparatus according to the above embodiment, since the vertebra is disposed above the lower end portion of the wiper arm tip, even when a frictional force is generated between the wiper strip and the glass surface of an automobile, the torsional moment between the wiper apparatus and the wiper arm is reduced, and thus vibration may be prevented during an operation of the wiper apparatus. In detail, as described in the above embodiment, when the vertebra is disposed above the lower end of the wiper arm tip by about 2 mm to about 5 mm, a vibration prevention effect of the wiper apparatus may be increased much. Furthermore, in the wiper apparatus according to the above embodiment, since torsional moment between the wiper blade and the wiper arm is reduced, vibration due to a difference in the speed between both ends of a blade may be efficiently prevented. Accordingly, during the operation of a wiper, vibration at a rear end tail may be reduced, and thus wiping performance may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A wiper apparatus, comprising:
a vertebra having a rod shape to provide elastic resilience to a wiper strip;
a connector connected to the vertebra; and
a wiper arm detachably coupled to the connector,
wherein the vertebra is disposed above a lower end of a wiper arm tip formed on a free end portion of the wiper arm,
a spacer is coupled to the connector to be rotatable in a certain range and detachably coupled to the wiper arm,
a holder member that is slidably coupled to the vertebra along a lower surface of the vertebra and forcibly inserted into a tunnel shape coupling portion of the connector to hold the vertebra and the connector together, and
in rotation of the spacer in a certain angular range with respect to the connector, a rotation angular range of the spacer is determined as a rotation range detection protrusion provided in the spacer is stopped by a stopper provided in the connector.

2. The wiper apparatus of claim 1, wherein a vertical distance between the vertebra and the lower end of the wiper arm tip is about 2 mm to about 5 mm.

3. The wiper apparatus of claim 1, wherein the spacer comprises a detachment switch that serves as a key when the spacer is detachably coupled to the wiper arm,
the detachment switch comprises a pair of arm portions extending from front lower portions of the spacer toward a rear side and a handle portion connecting the arm portions, and
at least one of the arm portions comprises an escape prevention recess portion that prevents escape of the wiper arm.

* * * * *